United States Patent [19]

Cadeddu

[11] Patent Number: 5,052,760
[45] Date of Patent: Oct. 1, 1991

[54] HYDRAULIC PROPORTIONING VALVE

[75] Inventor: Leonardo Cadeddu, Crema, Italy

[73] Assignee: Bendix Italia S.p.a., Crema, Italy

[21] Appl. No.: 353,927

[22] Filed: May 18, 1989

[30] Foreign Application Priority Data

May 20, 1988 [IT] Italy ................................ 20652 A/88

[51] Int. Cl.⁵ .............................................. B60T 8/18
[52] U.S. Cl. ................................. 303/9.62; 188/349;
303/9.75; 277/165
[58] Field of Search ................ 303/9.62, 9.63, 9.75,
303/69, 84.1, 84.2; 188/349; 137/505, 508;
251/358; 277/125, 165, 188 R, 189.5; 60/591

[56] References Cited

U.S. PATENT DOCUMENTS

| Re. 31,171 | 3/1983 | Brent | 277/165 X |
|---|---|---|---|
| 3,278,241 | 10/1966 | Stelzer | 303/9.75 |
| 3,395,532 | 8/1968 | Stelzer | 188/349 X |
| 3,848,880 | 11/1974 | Tanner | 277/188 R |
| 4,062,597 | 12/1977 | Sawyer et al. | 188/349 X |
| 4,113,317 | 9/1978 | Farr | 188/349 X |

FOREIGN PATENT DOCUMENTS

| 1531001 | 11/1978 | United Kingdom | 303/9.62 |
|---|---|---|---|
| 1549635 | 8/1979 | United Kingdom | 303/9.62 |

Primary Examiner—Matthew C. Graham
Attorney, Agent, or Firm—Larry J. Palguta; Ken C. Decker

[57] ABSTRACT

The hydraulic proportioning valve comprises a body (10) having a stepped bore (12) which receives a cylindrical piston (22) biased toward a rest position by a spring (40), and an inlet (16) and an outlet (14) communicating with the bore (12). The piston (22) includes a part (30) with an adjacent valve member (42). The valve member (42) includes a central opening into which the part (30) may be received slideably and sealingly. The sealing engagement between the part (30) and valve member (42) is maintained even though a pressure differential across the valve member (42) may cause the valve member (42) to be displaced in the bore (12).

6 Claims, 3 Drawing Sheets

HYDRAULIC PROPORTIONING VALVE

The present invention relates to a hydraulic proportioning valve and, more particularly to such valves intended for use in the brake circuits of automotive vehicles.

During the braking of a vehicle most of the load is taken by the front wheels. If equal hydraulic pressures are applied to the front and rear wheels of the vehicle the rear wheels will tend to lock before the front wheels due to their lesser load. In order to avoid this undesirable occurrence a proportioning valve is generally included in the hydraulic line to the rear brakes so as to limit the pressure increase when the rear braking pressure exceeds a certain value. An example of such a correcting valve is given in the document GB-A-1,531,001.

With modern vehicles it is increasingly common to include an anti-skid system in the braking circuit. In operation such a circuit requires that the hydraulic pressure applied to the vehicle brakes vary very rapidly. It is important therefore that the proportioning valve does not impede this rapid variation in braking pressure.

The proportioning valve described in GB-A-1531001 has a piston assembly displaceable in a bore in the valve under the influence of hydraulic pressure, between an open position and a closed position where the piston engages an inwardly projecting annular lip on a ring seal fixedly mounted in the bore. Upon decrease of the applied pressure the annular lip tilts to allow fluid to flow back from the brakes towards the master cylinder. Due to its structure, and especially due to the use of a tilting lip, the hysteresis of this device is too great to allow it to be used in an anti-skid circuit.

It is therefore an object of the invention to provide a hydraulic proportioning valve of simple construction, which is reliable, and whose response characteristics and especially whose hysteresis characteristics make it suitable for use in a vehicle braking circuit which includes an anti-skid system.

According to the invention there is provided a hydraulic proportioning valve comprising a body in which is formed a bore which communicates with an inlet and an outlet, a piston slideably mounted in the bore and urged towards a rest position by a spring, a valve member mounted in the bore and engageable by a part of the piston when the piston moves against the spring, under the influence of hydraulic pressure in the bore, to close the passage between the inlet and the outlet characterized in that the valve member is slideable in the bore, when engaged by the part of the piston, under the effect of a pressure differential across it.

One embodiment of the invention will now be described by way of example with reference to the accompanying drawings in which.

Figure 1:
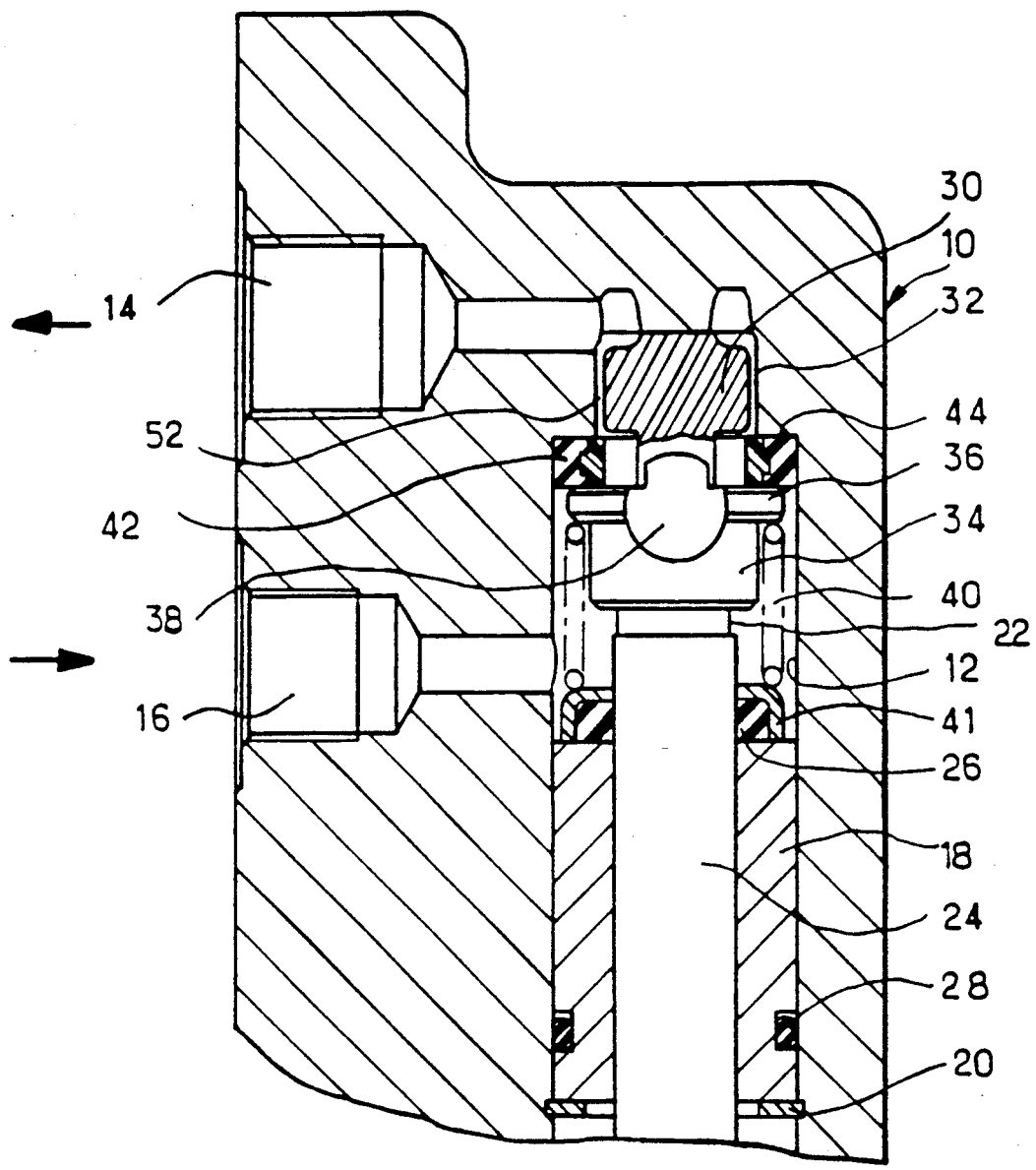
FIG. 1 is a partial longitudinal section through a hydraulic proportioning valve in accordance with the present invention.

As shown in FIG. 1 the hydraulic proportioning valve for use on an automotive vehicle comprises a body 10 in which is formed a longitudinal stepped bore 12. The bore 12 communicates at a closed end with a fluid outlet 14 which is intended, in use, to be connected to the rear brakes of the vehicle (not shown) and, at a point along the length of the bore 12, with a fluid inlet 16 intended, in use, to be connected to a source of hydraulic pressure, for example the vehicle master cylinder (not shown). A tubular sleeve 18 is fixedly mounted in the bore 12 by means of an annular circlip 20. A piston 22 is located in the bore 12 and comprises a longitudinally extending stem 24 which is slideably received in the sleeve 18. The bore 12 is sealed by two annular seals 26 and 28.

Figure 6:
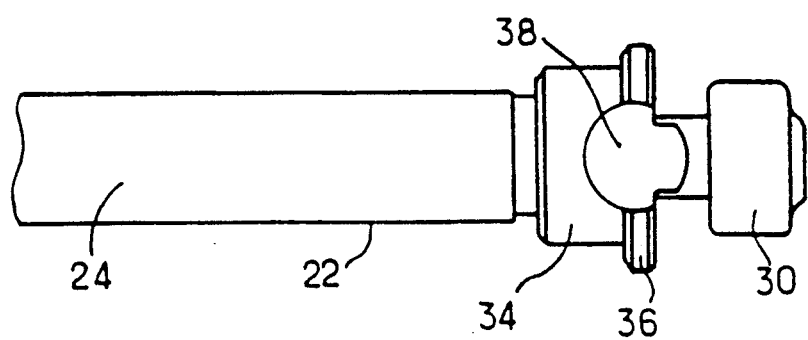
FIG. 6 is a detailed view of a component of FIG. 1.

The piston 22 comprises a generally cylindrical head 30 which is received, with play, in an end part 32 of reduced diameter of the bore 12. As can more clearly be seen in FIG. 6 the piston 22 comprises a central portion 34 of increased diameter and which carries an annular collar 36 which is cut at one point by an opening 38. One end of a helical spring 40 bears against the collar 36 and the other end bears against a metal ring 41 mounted around the seal 26. The spring 40 thus tends to urge the piston 22 towards its rest position illustrated in FIG. 1 in which the head 30 engages the end wall of the bore 12. An annular composite seal 42 is mounted in the bore 12 adjacent a shoulder 44 and the end of the part of the bore of increased diameter. The seal 42 comprises an outer ring 46 having a generally C-shaped cross-section and which is made of an elastomeric material such as rubber. The seal 42 also comprises an inner ring 48 which is made of a material having a low coefficient of friction such as polytetrafluoroethylene. This inner ring 48 has an external flange 50 which is received in the jaws of the C-shaped outer ring 46. As will be seen below, the composite seal 42 is free to slide in the bore 12. In use the stem 24 may be linked by a spring arrangement to the suspension of the vehicle in a way known per se in order to make the proportioning valve responsive to the load of the vehicle.

The proportioning valve which has been described above operates as follows.

FIG. 1 shows the valve in its rest position with the head 30 of piston 22 urged into abutment with the end of the bore 12 by the spring 40. During braking fluid under pressure passes in the direction of the arrows from the inlet 16 by way of the bore 12, opening 38 and an annular passage 52 between the head 30 and the bore 12 to the outlet 14 and thence to the brakes of the rear wheels of the vehicle. During this initial phase the rear braking pressure $P_F$ corresponds to the section 0–1 of the graph shown in FIG. 2.

When the hydraulic pressure acting on the cross section of the stem 24 exceeds the force exerted on the piston 22 by the spring 40 the piston 22 moves away from the end of the bore 12 and the outer surface of the head 30 engages the inner surface of the seal 42. This position is shown in FIG. 3. In this position the piston is in equilibrium and further increase in the inlet pressure will result in modulation of the piston between its closed position and a partially open position in a way which is known per se. Pressure to the rear brakes will thus increase at a lower rate than pressure to the front brakes. This phase corresponds to the section 1–2 on the graph of FIG. 2.

Upon release of braking, whether in conventional circumstances, or when the brake circuit is in the anti-skid mode, the hydraulic pressure at the inlet 16 decreases. This produces a pressure differential across the piston head 30 which causes the piston 22 to move away from the end of the bore 12 with the piston head 30 sliding through the seal 42. The piston 22 slides down towards a lower position whose maximum limit is defined by the central portion 34 coming into abutment against the metal ring 41. This position corresponds to that shown in FIG. 4. During the displacement of the piston 22 the volume of the part of the bore 12 of reduced diameter 54 increases. This increase in volume creates a corresponding decrease in pressure applied to the brakes. This phase of braking is shown by the section 2-3 of the graph in FIG. 2.

Figure 4:
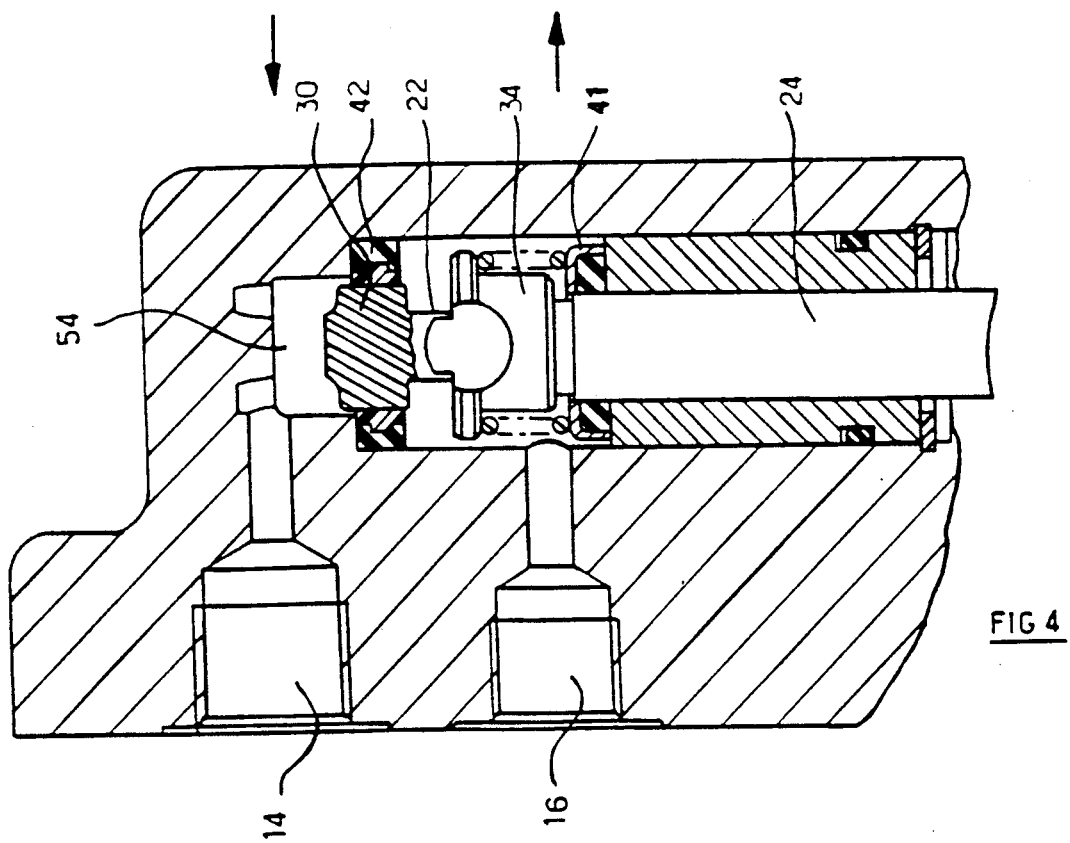
Figure 5:
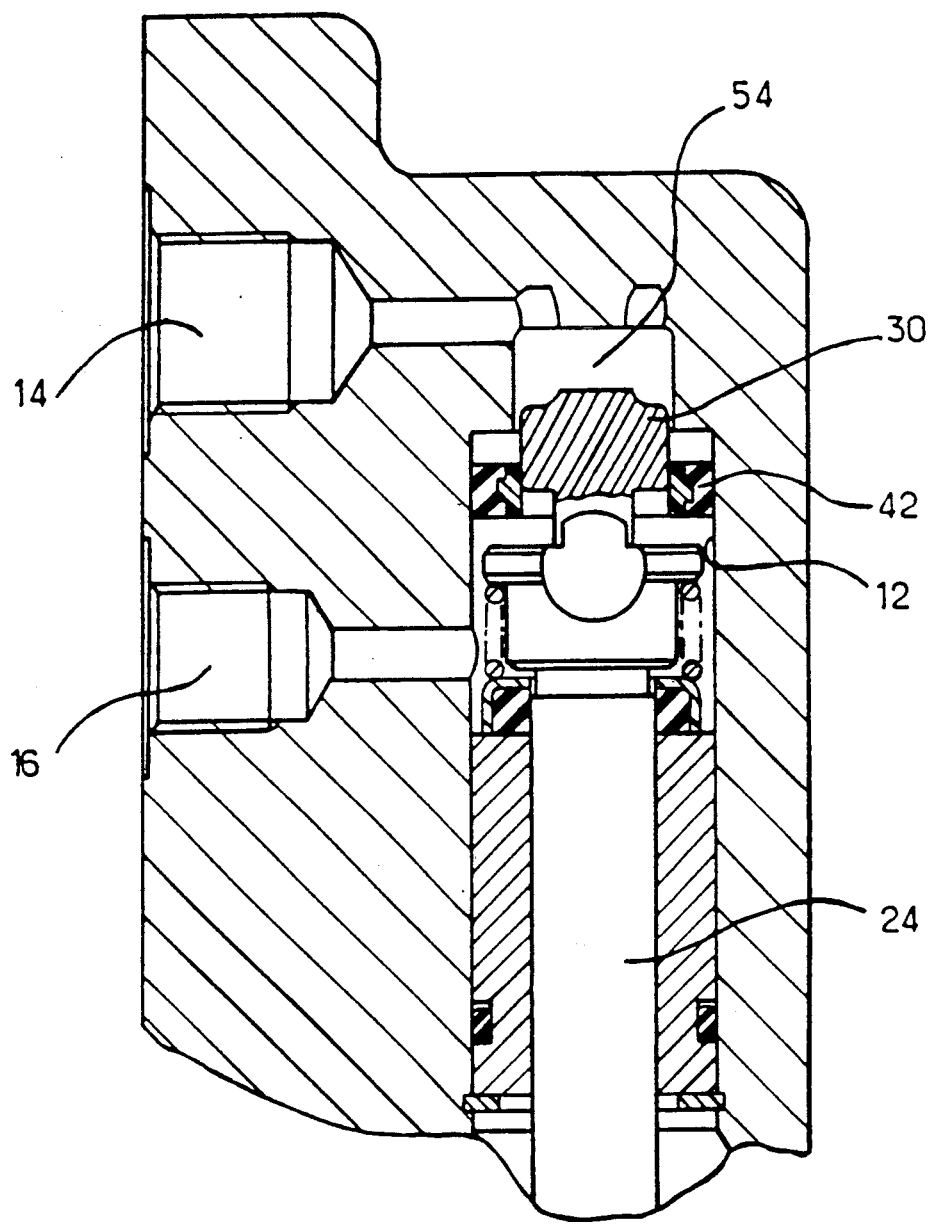

When the piston 22 has reached its abutment position shown in FIG. 4 a further decrease in braking pressure at the rear wheels can be brought about by a further increase in the volume of the lower part 54 of the bore 12 allowed by an inversion of the pressure difference across the piston head 30. This increase is assured by the seal 42 which slides in the bore 12 from its position in which it engages shoulder 44 to the position shown in FIG. 5, and thus allows the pressures on each side of the piston to equalize. This further decrease in pressure corresponds to the section 3-1 on the graph of FIG. 2.

Figure 2:
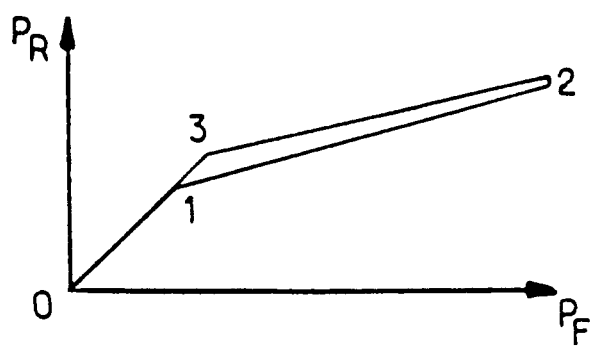
FIG. 2 is a graph showing the pressure response characteristics of the valve of FIG. 1.
Figure 3:
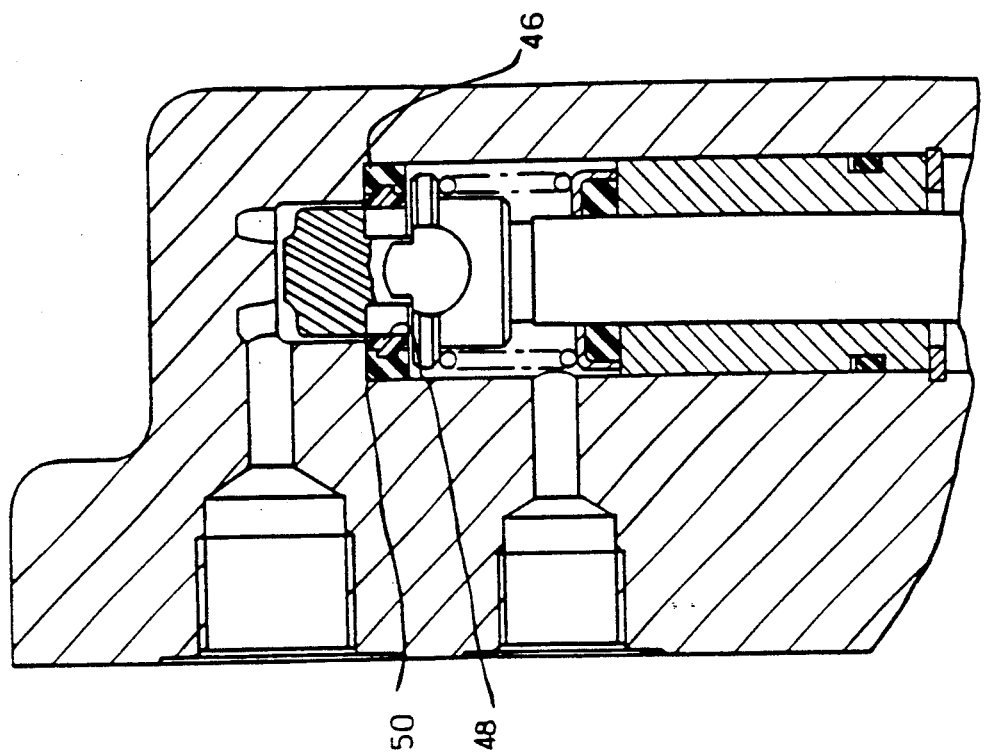
FIG. 3, 4 and 5 are each views similar to that of FIG. 1 showing the proportioning valve in various stages of operation.

Thus, from FIG. 2 it will be seen that the hysterisis of the present proportioning valve is very low making it particularly suitable for use in a brake circuit which includes an anti-skid system.

When the brakes of the vehicle are completely released the piston 22 returns to its rest position shown in FIG. 1, the annular collar 36 pushes the seal back into its position in which it engages the shoulder 44 of the bore 12.

It is envisaged that the present invention also be applied to double proportioning valves.

I claim:

1. A hydraulic proportioning valve comprising a body in which is formed a bore which communicates with an inlet and an outlet, a piston mounted slideably in the bore and urged toward a rest position by a spring, a valve member mounted in the bore and engageable by a part of the piston when the piston moves against the spring, under the influence of hydraulic pressure in the bore, to close a passage between the inlet and the outlet, characterized in that the valve member is slideable in the bore, independently of the piston, under the effect of a pressure differential across the valve member, the valve member comprising a seal disposed about the piston by means of a central opening which may be closed by sealing engagement between the valve member and part of the piston, the sealing engagement between the part and the valve member enabling the creation of said pressure differential across the valve member, and the slideable movement of the valve member in response to said pressure differential including continuous slideable engagement of the part within the valve member such that said sealing engagement is maintained during the continuous slideable engagement and the central opening remaining closed despite said slideable movement.

2. The proportioning valve in accordance with claim 1, characterized in that the piston is generally cylindrical, the seal being generally annular, and the part having a cylindrical surface with an axial length for said sealing engagement of the valve member at the central opening.

3. The proportioning valve in accordance with claim 2, characterized in that the seal is a composite and comprises an outer ring of a first material and in which is received an inner ring of a second material having a lower coefficient of friction than that of the first material.

4. The proportioning valve in accordance with claim 3, characterized in that the outer ring has a generally C-shaped cross-section, the inner ring comprising an external flange which is received within the curve of the C-shaped outer ring.

5. The proportioning valve in accordance with claim 4, characterized in that the outer ring is made of rubber and the inner ring is made of polytetrafluoroethylene.

6. The proportioning valve in accordance with claim 1, characterized in that the piston comprises a projection adapted to engage the valve member when the piston returns to the rest position.

* * * * *